(12) United States Patent
Duppong

(10) Patent No.: US 10,021,856 B2
(45) Date of Patent: Jul. 17, 2018

(54) FLOORING PANEL ASSEMBLIES AS WELL AS FLOORING SYSTEMS AND METHODS OF ASSEMBLY

(71) Applicant: J&L Wire Cloth, LLC, St. Paul, MN (US)

(72) Inventor: James A. Duppong, Lake Elmo, MN (US)

(73) Assignee: J&L Wire Cloth, LLC, St. Paul, MN (US)

( * ) Notice: Subject to any disclaimer, the term of this patent is extended or adjusted under 35 U.S.C. 154(b) by 0 days.

(21) Appl. No.: 15/617,874

(22) Filed: Jun. 8, 2017

(65) Prior Publication Data

US 2017/0354117 A1     Dec. 14, 2017

Related U.S. Application Data

(60) Provisional application No. 62/347,561, filed on Jun. 8, 2016, provisional application No. 62/347,562, filed on Jun. 8, 2016.

(51) Int. Cl.

| | |
|---|---|
| *A01K 1/01* | (2006.01) |
| *A01K 1/015* | (2006.01) |
| *E04B 5/02* | (2006.01) |
| *E04F 15/16* | (2006.01) |

(52) U.S. Cl.
CPC .............. *A01K 1/0151* (2013.01); *A01K 1/01* (2013.01); *E04B 5/023* (2013.01); *E04F 15/16* (2013.01)

(58) Field of Classification Search
CPC ........ A01K 1/0151; A01K 1/01; E04B 5/023; E04B 5/10
See application file for complete search history.

(56) References Cited

U.S. PATENT DOCUMENTS

| | | | | |
|---|---|---|---|---|
| 385,149 | A | * | 6/1888 | Stowe ................... A01K 1/0157 119/525 |
| 4,885,884 | A | * | 12/1989 | Schilger .................. E04B 35/04 52/354 |
| D318,148 | S | * | 7/1991 | Peltier .............................. 245/2 |
| 5,749,322 | A | * | 5/1998 | Chagnon .............. A01K 1/0151 119/509 |
| 2003/0213202 | A1 | * | 11/2003 | Hutchings ............ A01K 1/0151 52/578 |
| 2015/0275498 | A1 | * | 10/2015 | Belanger ................... E04C 2/42 210/164 |

\* cited by examiner

*Primary Examiner* — Beth A Stephan
(74) *Attorney, Agent, or Firm* — Fay Sharpe LLP

(57) ABSTRACT

A flooring system includes a flooring panel and a support element. The flooring panel has an outer periphery and defines an upper panel plane and a lower panel plane that is offset from the upper panel plane. The flooring panel includes a plurality of openings formed therethrough within the outer periphery. The support element extends lengthwise between opposing ends and includes an upper edge and a lower edge. The support element extends through and operatively connects with the flooring panel such that the upper edge is disposed in approximate alignment with the upper panel plane and the lower edge is disposed in offset relation to the lower panel plane in a direction opposite the upper panel plane. Methods of assembly are also included.

20 Claims, 18 Drawing Sheets

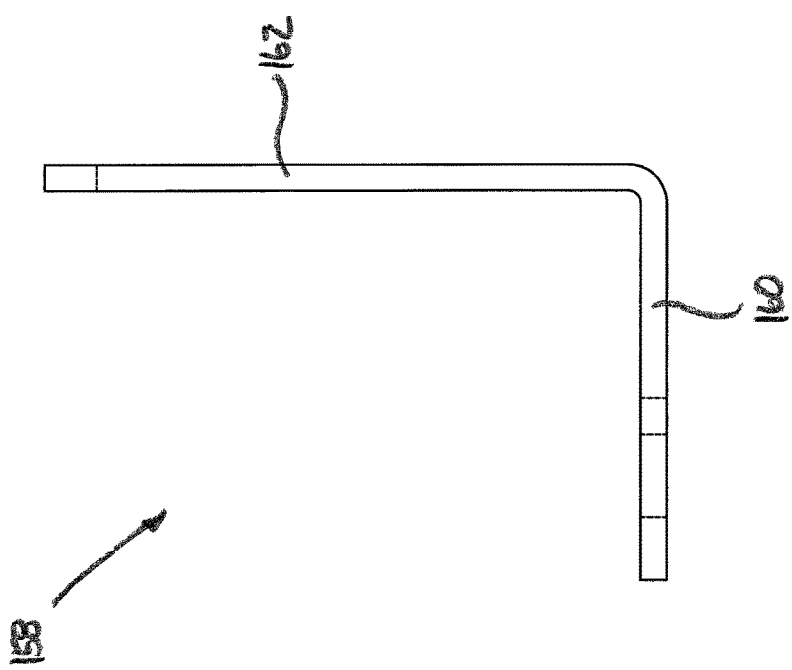

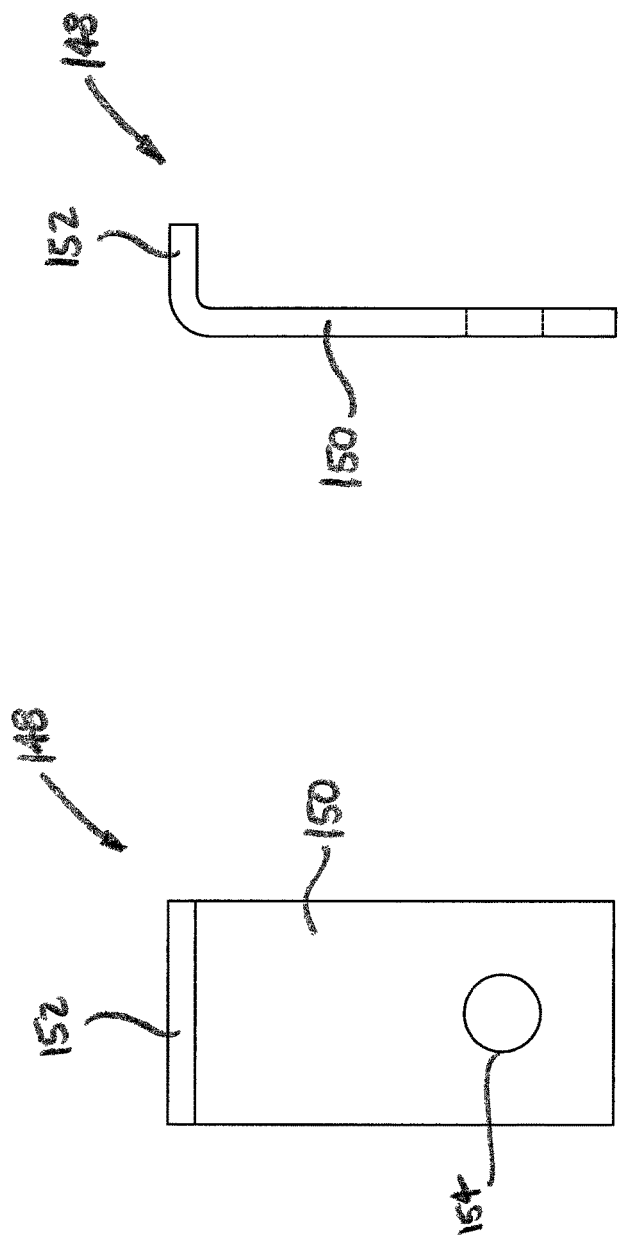

ND METHODS
FLOORING PANEL ASSEMBLIES AS WELL AS FLOORING SYSTEMS AND METHODS OF ASSEMBLY

This application claims priority from U.S. Provisional Patent Application No. 62/347,561, filed on Jun. 8, 2016, and from U.S. Provisional Patent Application No. 62/347,562, filed on Jun. 8, 2016, the entire disclosure of each of which is hereby incorporated by reference herein.

BACKGROUND

The subject matter of the present disclosure broadly relates to the art of flooring systems and, more particularly, to flooring assemblies and/or systems that are constructed to extend across a pit, channel or other area while under the weight of a live or static load that is at least temporarily supported thereon. Methods of assembling such flooring systems are also included.

It will be appreciated that flooring panel assemblies, flooring systems and methods of assembly in accordance with the subject matter of the present disclosure may find particular application and use in connection with agricultural installations, will be described herein with specific reference thereto. However, it is to be recognized and understood that the subject matter of the present disclosure is amenable to broad use in a wide variety of applications and environments, and that the specific references herein to agricultural installations are merely exemplary and not intended to be limiting.

Flooring assemblies and/or systems for use in supporting livestock over manure pits, channels and/or other areas are well known and commonly used. Typically, such flooring systems will include grated panels that are supported on frames or sub-structures that extend across the pits, channels and/or other areas. The grated panels permit excrement and other materials to pass through the grated flooring and into the subjacent pit, channel and/or other area, as is well known. In addition to being capable of allowing manure and other matter to reach the subjacent space, it is generally desirable for agricultural flooring systems provide a sturdy and stable surface along and/or across which livestock can move and stand. While grated panels having larger openings may provide improved transfer of excrement and/or facilitate cleaning, openings of greater size can disadvantageously result in a decrease in comfort and an increase in stress of livestock moving and standing on such grated panels. In an attempt to improve the suitability of conventional grated flooring panels, polymeric mats are sometimes installed over top of the grated flooring panels. In some cases, the use of such polymeric mats may improve the comfort and welfare of the livestock. However, the use of such polymeric mats add cost to the operation of a farm or other agricultural facility, and may need to be removed for cleaning, which disadvantageously further increases the cost of use.

Notwithstanding any commercial success of conventional agricultural flooring assemblies and/or systems, it is believed that a need exists to address the foregoing and/or other disadvantages of known constructions while still retaining comparable or, preferably, improving factors such as animal comfort and welfare, cost of installation and/or manufacture, and ease of maintenance. Thus, it is believed to be generally desirable to develop new constructions and/or designs that may advance the art of agricultural flooring assemblies and/or systems.

BRIEF DESCRIPTION

One example of a flooring system in accordance with the subject matter of the present disclosure can include a flooring panel and a support element. The flooring panel can have an outer periphery and can define an upper panel plane and a lower panel plane that is offset from the upper panel plane. The flooring panel can include a plurality of openings formed therethrough within the outer periphery. The support element can extend lengthwise between opposing ends and can include an upper edge and a lower edge. The support element can extend through and operatively connect with the flooring panel such that the upper edge is disposed in approximate alignment with the upper panel plane and the lower edge is disposed in offset relation to the lower panel plane in a direction opposite the upper panel plane.

One example of a method of assembling a flooring system in accordance with the subject matter of the present disclosure can include providing a plurality of first panel wires and providing a plurality of second panel wires. The method can also include interconnecting the plurality of second panel wires with the plurality of first panel wires to at least partially form a flooring panel having an outer periphery and defining an upper panel plane and a lower panel plane that is offset from the upper panel plane. The method can further include providing a support element extending lengthwise between opposing ends and including an upper edge and a lower edge. The method can also include operatively connecting the support element to one or more of the plurality of second wires between adjacent ones of the plurality of first wires such that the support element extends through and operatively connects with the flooring panel such that the upper edge is disposed in approximate alignment with the upper panel plane and the lower edge is disposed in offset relation to the lower panel plane in a direction opposite the upper panel plane.

One example of a flooring panel (or assembly) in accordance with the subject matter of the present disclosure can have an outer periphery. The flooring panel can include a plurality of first panel wires extending in a first direction across the outer periphery. The plurality of first panel wires can have an approximately common first nominal cross-sectional dimension. A plurality of second panel wires can extend in a second direction across the outer periphery. The second direction is oriented transverse to the first direction of the plurality of first panel wires. The plurality of first panel wires can be spaced apart from one another in the second direction such that a gap is formed between adjacent wires. The gap can have an approximate distance in the second direction of less than approximately thirty-five percent of the first nominal cross-sectional dimension of the plurality of first panel wires.

A flooring panel according to the foregoing paragraph can include the gap having an approximate distance in the second direction of less than approximately thirty percent of the first nominal cross-sectional dimension of the plurality of first panel wires.

A flooring panel according to the foregoing paragraph can include the gap having an approximate distance in the second direction of less than approximately twenty-five percent of the first nominal cross-sectional dimension of the plurality of first panel wires.

A flooring panel according to any one of three foregoing paragraphs with the plurality of first panel wires including a plurality of first pockets formed therealong.

A flooring panel according to the foregoing paragraph with the plurality of first pockets that are formed along the plurality of first panel wires being substantially-uniformly spaced relative to one another therealong.

A flooring panel according to any one of the five foregoing paragraphs with the plurality of first panel wires including a plurality of notches disposed in spaced relation to one another therealong.

A flooring panel according to the foregoing paragraph with the plurality of notches disposed along at least one side of the plurality first panel wires.

A flooring panel according to either one of the two foregoing paragraphs in which the plurality of notches are disposed along opposing sides of the plurality of first panel wires.

A flooring panel according to any one of the three foregoing paragraphs in which the plurality of first panel wires include a midline and the plurality of notches include a notch surface disposed at an acute angle to the midline.

A flooring panel according to the foregoing paragraph with the plurality of notches including opposing notch surfaces disposed along opposing sides of the midline of the plurality of first panel wires.

A flooring panel according to any one of the five foregoing paragraphs in which the plurality of notches include a notch surface portion and at least one side surface portion disposed transverse to the notch surface portion.

A flooring panel according to any one of the six foregoing paragraphs in which the plurality of notches are dimensioned to receive at least a portion of the plurality of second panel wires.

A flooring panel according to any one of the twelve foregoing paragraphs with the plurality of first panel wires including a plurality of first notches disposed in spaced relation to one another therealong with the plurality of first notches facing in a first direction.

A flooring panel according to the foregoing paragraph with the plurality of first panel wires including a plurality of second notches disposed in spaced relation to one another therealong and in spaced relation to the plurality of first notches with the plurality of second notches facing in a second direction opposite the first direction.

Another example of a method of assembling a flooring panel (or assembly) in accordance with the subject matter of the present disclosure can include providing a plurality of first panel wires and forming a plurality of pockets therealong. The method can also include forming a plurality of first notches disposed in spaced relation to one another therealong with the plurality of first notches facing in a first direction. The method can further include providing a plurality of second panel wires with the plurality of second panel wires dimensioned for receipt within the plurality of first notches. The method can also include interconnecting the plurality of second panel wires with the plurality of first panel wires to at least partially form a flooring panel having an outer periphery.

A method according to the foregoing paragraph can further include forming a plurality of second notches disposed in spaced relation to one another along the plurality of first panel wires and in spaced relation to the plurality of first notches with the plurality of second notches facing in a second direction opposite the first direction.

BRIEF DESCRIPTION OF THE DRAWINGS

FIG. 11 is a side elevation view of the base element in FIGS. 9 and 10.

FIG. 12 is a front view of one example of a retainer element of the exemplary flooring system in FIGS. 2-8, such as is shown in FIG. 8.

FIG. 13 is a side elevation view of the retainer element in FIG. 12.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
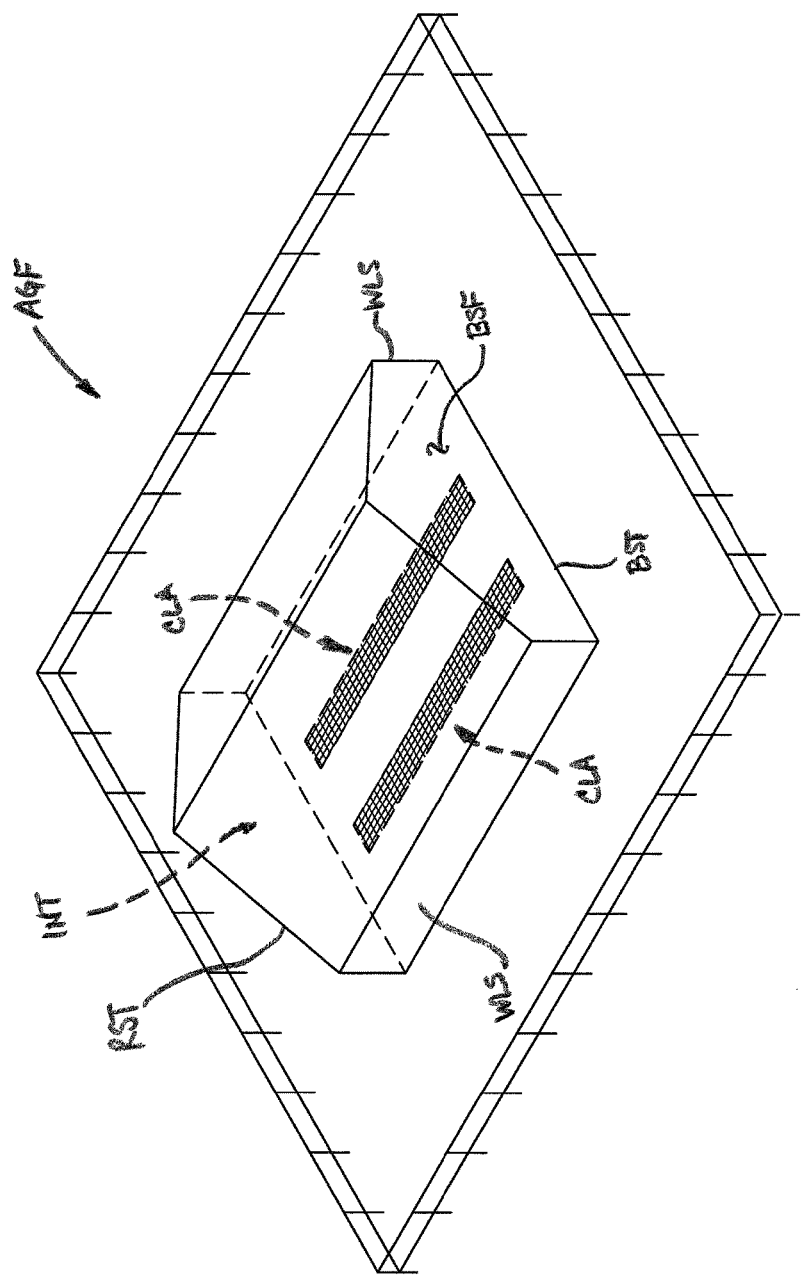
FIG. 1 is schematic representation of an agricultural facility including multiple collection areas with flooring systems in accordance with the subject matter of the present disclosure extending thereacross.
Figure 2:
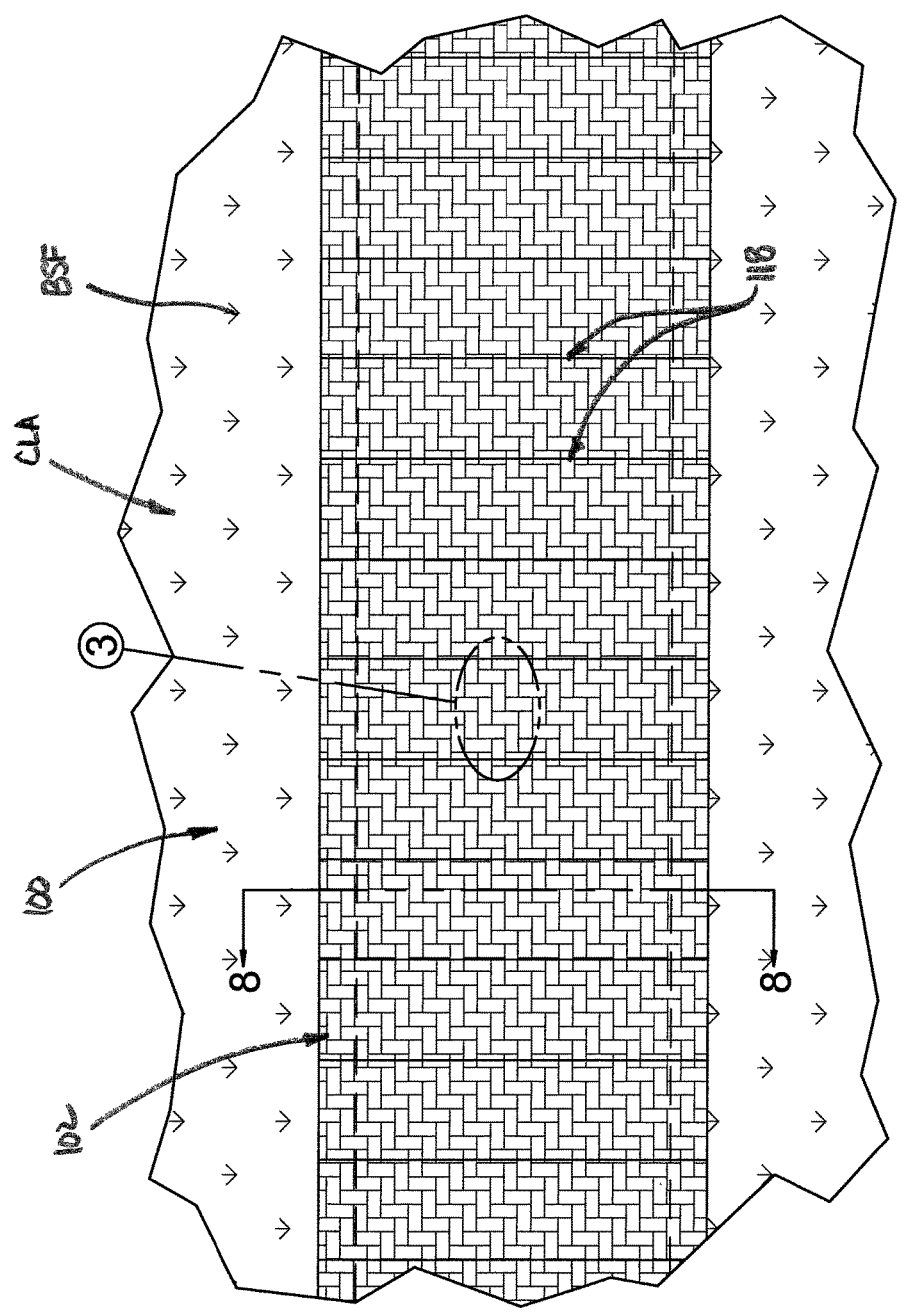
FIG. 2 is a top plan view of a portion of a collection area of the agricultural facility in FIG. 1 with flooring systems in accordance with the subject matter of the present disclosure extending thereacross.

FIG. 1 illustrates one example of an agricultural facility AGF for short-term holding and/or long-term raising of livestock. Non-limiting examples of such agricultural facilities can include farms, livestock holding and/or transfer yards, and auction houses. As such, it will be appreciated that the subject matter of the present disclosure is not intended to be limited to use in association with agricultural or livestock facilities of any particular type, kind, size and/or arrangement.

In the arrangement shown in FIGS. 1, 2, 8, 14 and 19, agricultural facility AGF is represented as taking the form of an interior storage facility that includes a base surface BSF on or along which livestock are housed. It will be appreciated that a base surface of any suitable type, kind and/or construction can be used, such as soil, concrete or other floor surfaces, for example. In many cases, the base surface will take the form of a prepared surface that is constructed and configured for prolonged exposure to large groups of livestock walking and standing on the base surface.

Agricultural facility AGF can include a base structure BST that at least partially forms base surface BSF. Agricultural facility AGF can optionally include a roof structure RST that extends across at least a portion of base surface BSF. In some cases, the roof structure can be supported on base structure BST using one or more structural components and/or features, such as one or more columns, posts and/or walls, for example. In the arrangement shown in FIG. 1, for example, a plurality of walls WLS extend between base structure BST and roof structure RST, and at least partially enclose the agricultural facility to form an interior INT thereof.

An agricultural facility in accordance with the subject matter of the present disclosure, such as agricultural facility AGF, for example, can include any suitable number of one or more collection areas for receiving manure, excrement and other waste materials from livestock. Additionally, it will be appreciated that such one or more collection areas can be positioned, organized or otherwise arranged in any suitable manner relative to one another and/or any associated agricultural facility features (e.g., walls). In the arrangement shown in FIG. 1, for example, a plurality of collection areas CLA are disposed adjacent one another along base surface BSF.

Figure 8:
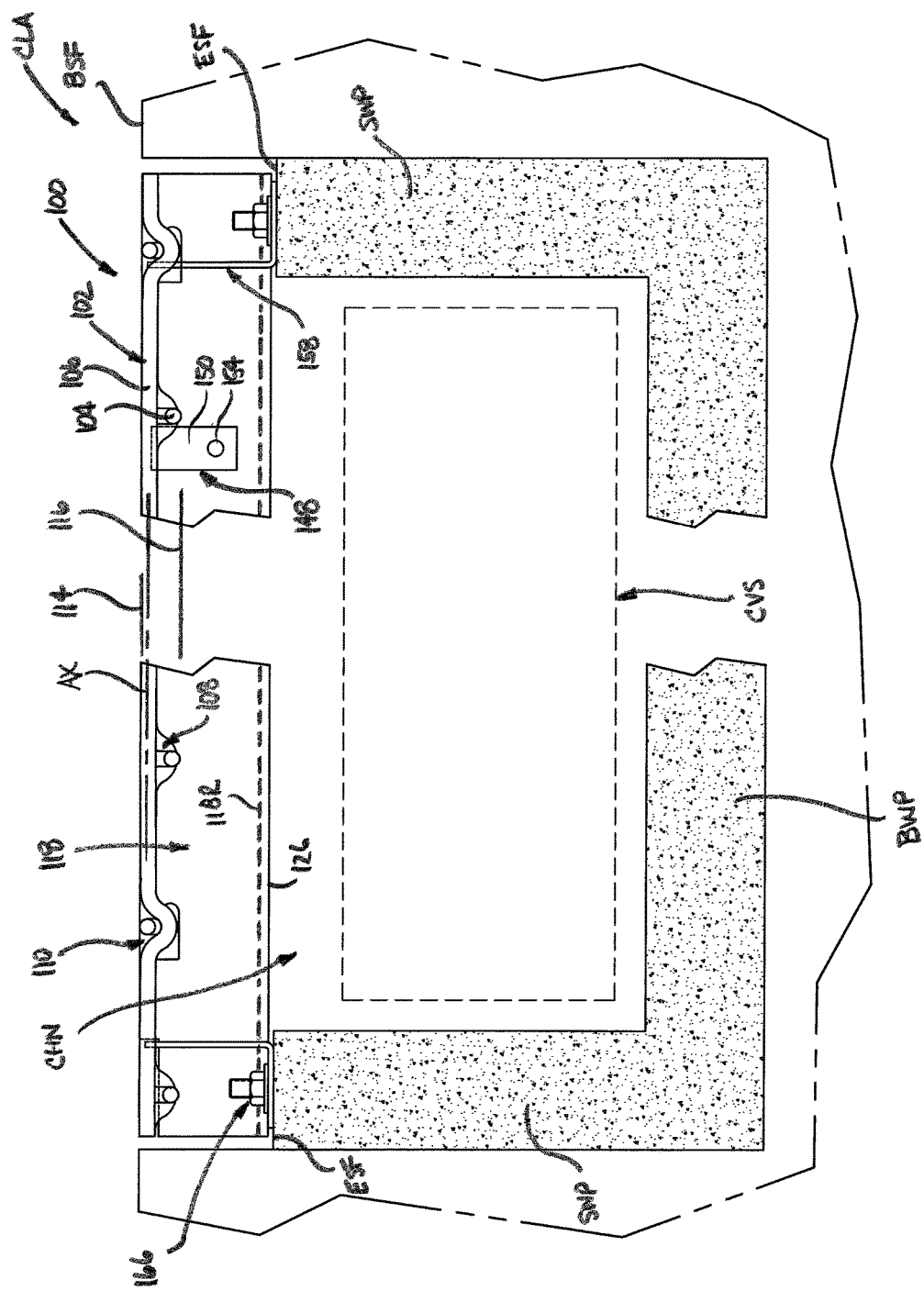
FIG. 8 is a side elevation view, in partial cross-section, of flooring systems in accordance with the subject matter of the present shown extending across the collection area of the agricultural facility, as identified by line 8-8 in FIG. 2.
Figure 9:
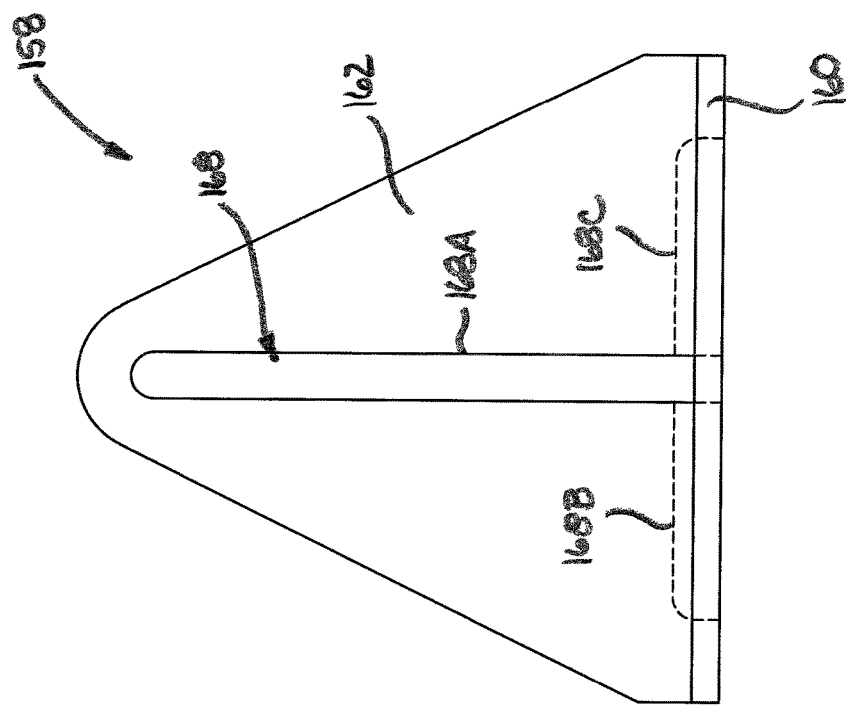
FIG. 9 is a front view of one example of a base element of the exemplary flooring system in FIGS. 2-8, such as is shown in FIG. 8.
Figure 10:
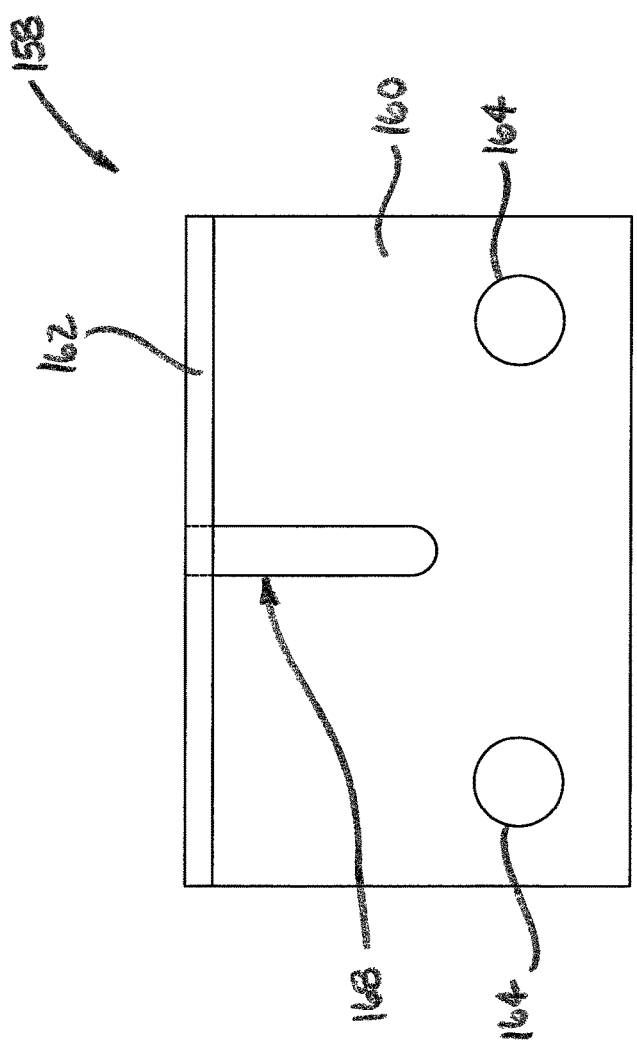
FIG. 10 is a top plan view of the base element in FIG. 9.
Figure 19:
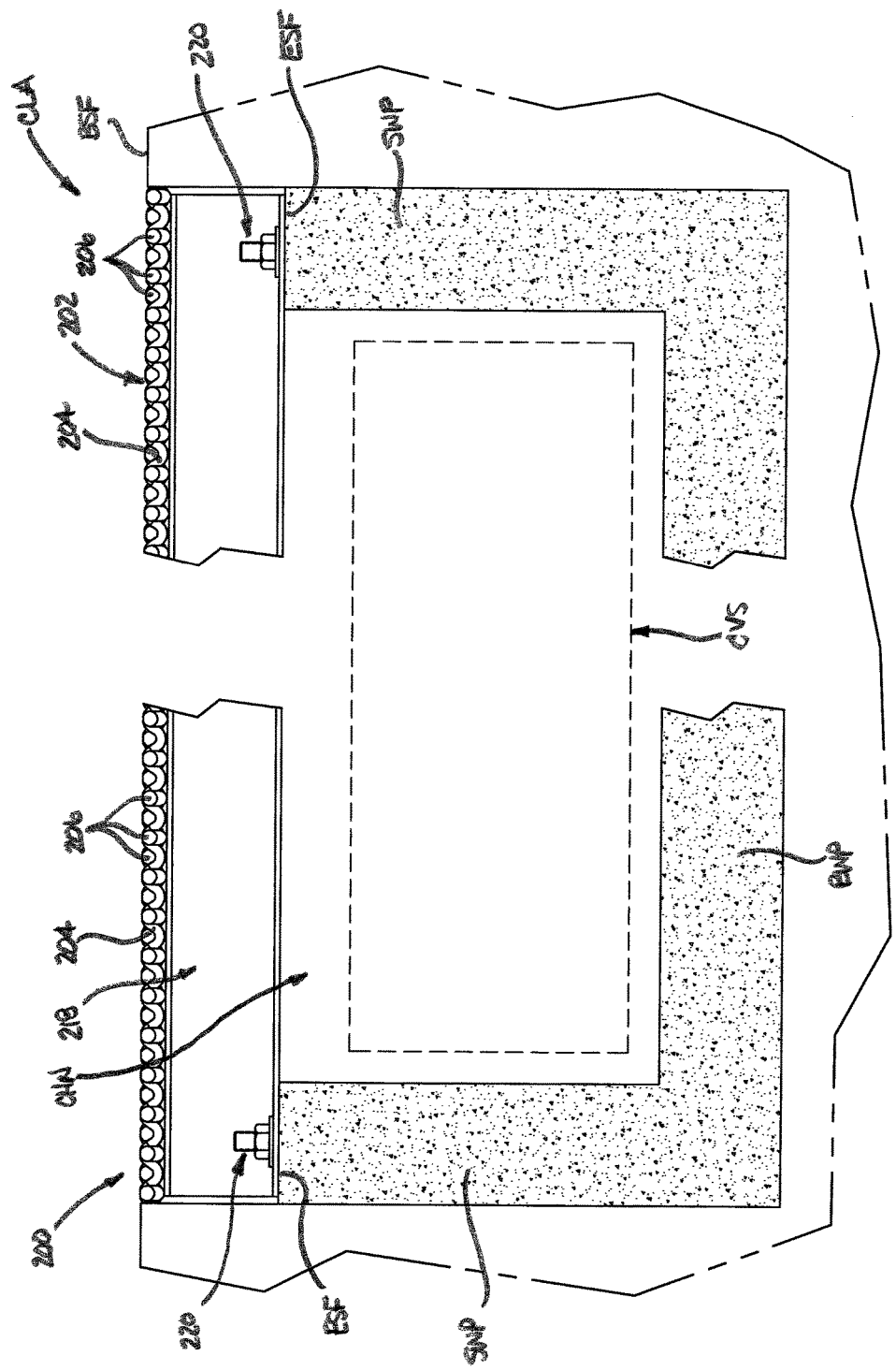
FIG. 19 is a side elevation view, in partial cross-section, of flooring assemblies in accordance with the subject matter of the present shown extending across the collection area of the agricultural facility, as identified by line 19-19 in FIG. 14.

It will be appreciated that collection areas CLA can be of any suitable type, kind, construction and/or configuration. In some cases, the one or more collection areas can be at least partially above base surface BSF. In many cases, however the collection areas will include a pit or cavity that extends below base surface BSF, such as is represented in FIGS. 8 and 19 by a channel CHN, for example. In some cases, one or more wall structures can at least partially define the pit, cavity or channel. In the arrangement shown in FIGS. 8 and 19, for example, channel CHN is at least partially defined by a bottom wall portion BWP and opposing side wall portions SWP that extend upwardly toward base surface BSF from along bottom wall portion BWP toward end surfaces ESF. In some cases, the collection areas can include additional features or components, such as, for example, a conveying system CVS for transporting manure and other waste products out of channel CHN.

As will be well understood, one function of a flooring assembly and/or system in accordance with the subject matter of the present disclosure can be to support livestock over a collection area thereby permitting manure and other waste products to be received in the pit, cavity or channel thereof. As shown in FIGS. 1, 2, 8, 14 and 19, a flooring assembly and/or system in accordance with the subject matter of the present disclosure is preferably disposed at the approximate level of base surface BSF such that unobstructed access onto and off of the flooring assembly and/or system can be provided. It will be appreciated, however, that other configurations and/or arrangements could alternately be used.

With reference, now, to FIGS. 2-8, one example of a flooring system 100 is shown that includes a flooring panel 102. It will be appreciated that flooring panels of any suitable size, shape, configuration and/or construction can be used. As one example, the flooring panel could take the form of a sheet of expanded metal that includes a plurality of holes or openings formed therethrough to permit excrement and other materials to pass through the flooring panel. In a preferred arrangement, however, flooring panel 102 can be formed from a plurality of wires that are operatively interconnected to one another, such as by welded joints and/or by interweaving the wires together with one another. Additionally, it will be appreciated that the flooring panels will have an outer periphery that at least partially defines the overall size and shape of the flooring panels. While it will be appreciated that any suitable size and/or shape can be used, as mentioned above, in many cases, the flooring panels will have a square or rectangular overall shape. As such, many flooring panel will can be referred to as having a length and a width as is conventionally understood.

Figure 3:
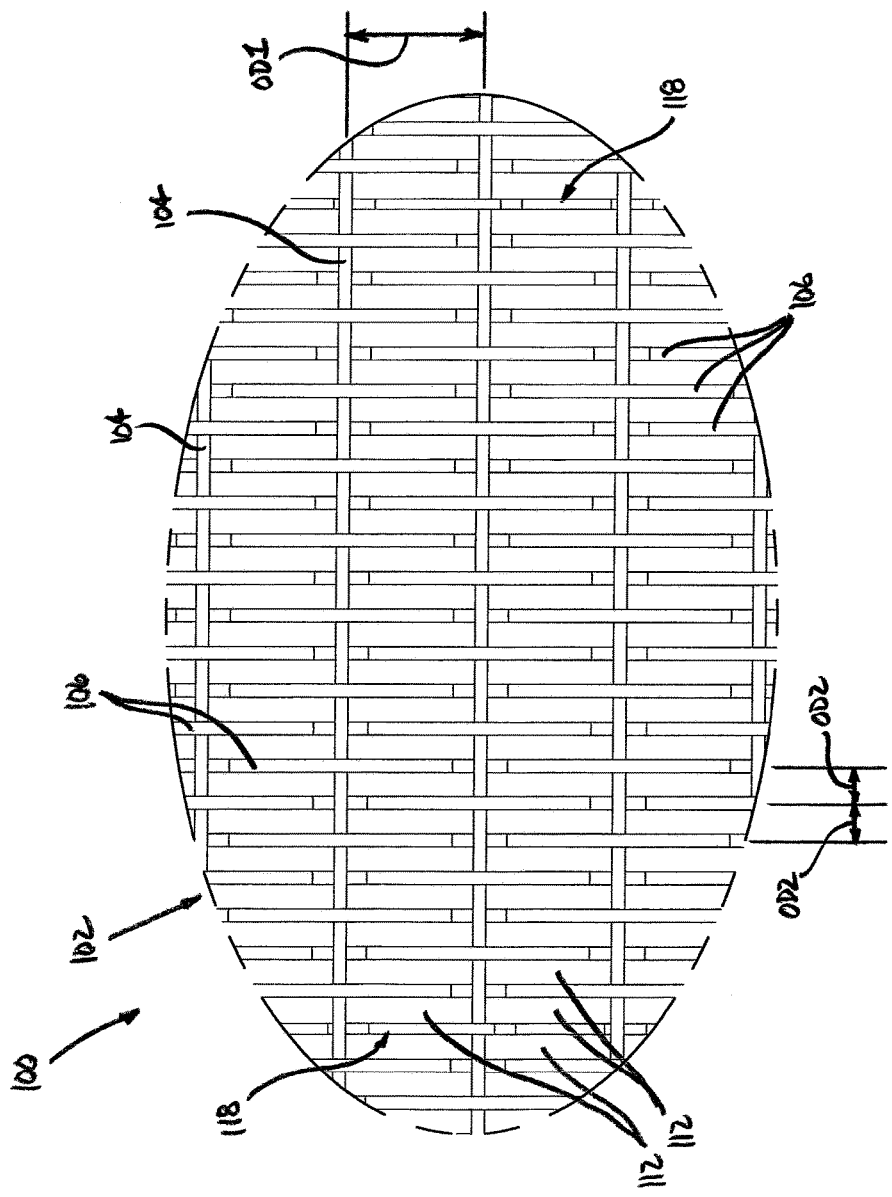
FIG. 3 is an enlarged plan view of a portion of the flooring system in FIGS. 1 and 2, which is identified as Detail 3 in FIG. 2.
Figure 4:
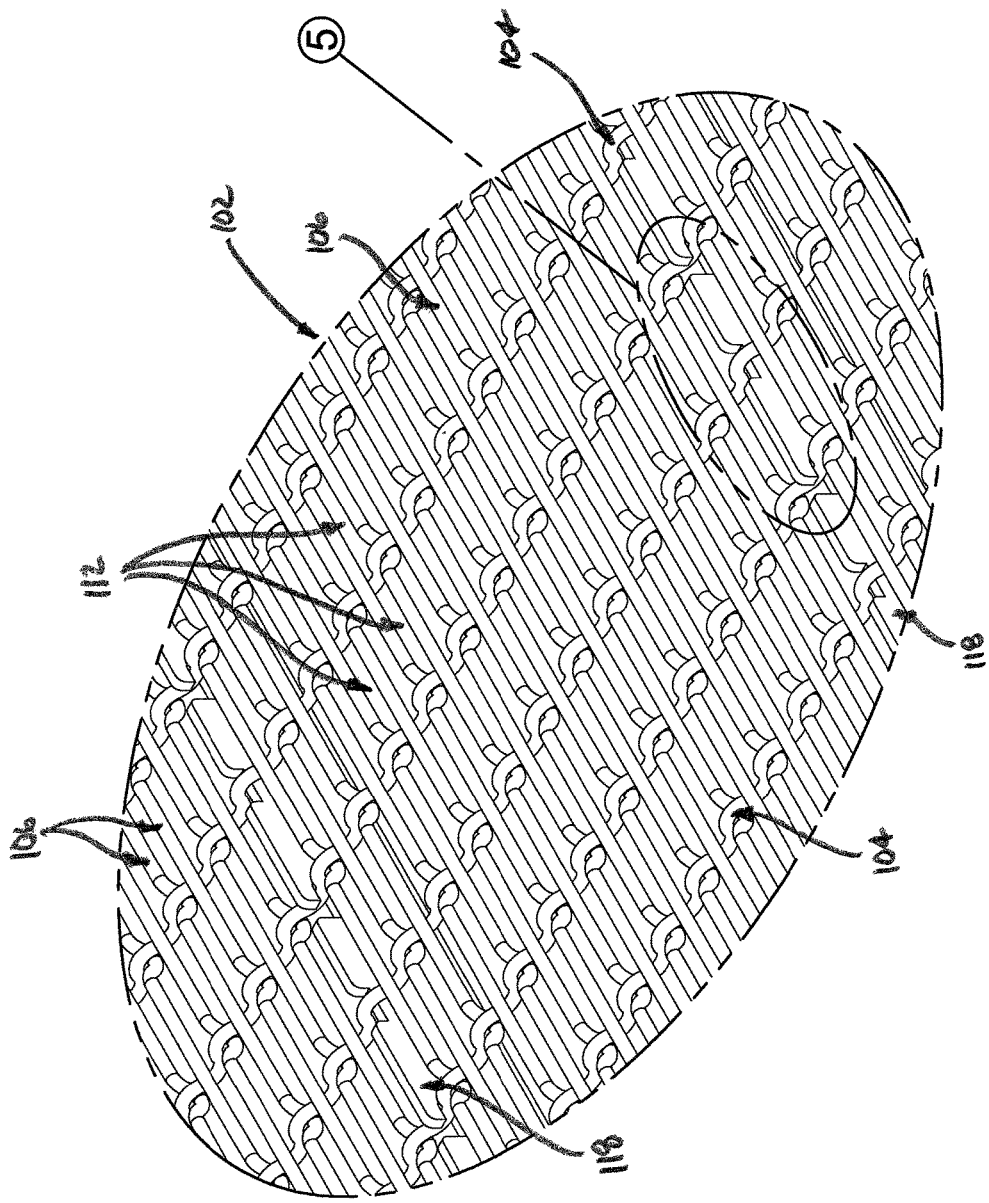
FIG. 4 is an enlarged perspective view of the portion of the exemplary flooring system shown in FIGS. 2 and 3.

As one example of a suitable construction, flooring panel 102 can include a plurality of first panel wires 104 that extend lengthwise along the flooring panel, such as are identified in FIGS. 3-6 and 8. First panel wires 104 may, in some cases, be referred to in the art as line wires, and extend lengthwise along flooring panel 102. In a preferred arrangement, first panel wires 104 are disposed in spaced relation to one another in the widthwise direction of the flooring panel, as is represented in FIG. 3 by a wire offset dimension OD1. Flooring panel 102 can also include a plurality of second panel wires 106 that extend widthwise along the flooring panel, such as are identified in FIGS. 3-6 and 8. Second panel wires 106 may, in some cases, be referred to in the art as cross wires, and extend widthwise along flooring panel 102. In a preferred arrangement, second panel wires 106 are disposed in spaced relation to one another in the lengthwise direction of the flooring panel, as is represented in FIG. 3 by a wire offset dimension OD2.

Additionally, in a preferred arrangement, first panel wires 104 can be formed from wire having an approximately round cross-sectional shape with a nominal cross-sectional dimension that can be approximately equal from one wire to the next. That is, in some cases, all of the first panel wires can be of a common size and have an approximately common cross-sectional shape. Similarly, second panel wires 106 can be formed from wire having an approximately round cross-sectional shape with a nominal cross-sectional dimension that can be approximately equal from one wire to the next. That is, in some cases, all of the second panel wires can be of a common size and have an approximately common cross-sectional shape. In some cases, the first and second panel wires can be substantially similar to one another in size and/or shape. In other cases, however, the first panel wires will be of a different size and/or shape than the second panel wires. An exemplary range approximate cross-sectional dimension for the first and second panel wires is from approximately 0.050 inches to approximately 0.500 inches. And, it will be appreciated that any suitable combination of sizes for the first and second panel wires can be used.

As shown in FIGS. 2-6 and 8, first panel wires 104 and second panel wires 106 are interwoven with one another to form a cloth-like mesh construction. The first and second panel wires can be formed into such a configuration in any suitable manner and through the use of any suitable combination of features on or along the first and second panel wires. As one example, first panel wires 104 can include a plurality of sections of wire that are deflected or otherwise deformed away from a reference axis AX (FIG. 8) to at least partially define pockets 108 that are disposed in spaced relation to one another along the length of the wire. Similarly, second panel wires 106 can include a plurality of sections of wire that are deflected or otherwise deformed away from reference axis AX to at least partially define pockets 110 that are disposed in spaced relation to one another along the length of the wire.

In many cases, the dimension or spacing between adjacent ones of pockets 108 and/or adjacent ones of pockets 110 (i.e., the spacing between adjacent pockets on a single wire) can be generally uniform. In some cases, however, such spacing could vary along the length of a single wire. Additionally, or in the alternative, the spacing between pockets can be consistent along a single wire, but can vary between one wire and an adjacent wire. In a preferred arrangement, such as is shown in FIGS. 2-6 and 8, for example, all of first panel wires 104 can have an approximately-uniform first pocket spacing (not identified) between adjacent pockets 108, and all of second panel wires 106 can have an approximately-uniform second pocket spacing (not identified) between adjacent pockets 110. In such case, the first pocket spacing can be different from the second pocket spacing such that rectangular holes or spaces 112 extending through flooring panel 102. It will be appreciated that as the spacing between adjacent pockets on a single wire increases, the wire can appear to have an approximately linear profile with only intermittent deviations due to the occasional pocket. Conversely, as the spacing between adjacent pockets on a single wire decreases, the wire can increasingly appear to have a continuous wave-like profile. In the arrangement shown in the subject application second panel wires 106 may appear to have a more linear profile whereas first panel wires 104 may appear to have more of a continuous wave-like profile. For purposes of clarity and ease of understanding, reference is made herein to a ridge being the section of wire extending between and connecting adjacent pockets along a single wire.

In a preferred construction, first panel wires 104 and second panel wires 106 are configured and arranged in such a way so as to at least partially define a first or top panel plane 114 and a second or bottom panel plane 116 that is offset from the top panel plane by approximately the height of the pockets formed on or along the first and second panel wires. As can be seen from FIGS. 3-5 and 8, for example, in a preferred arrangement, first and second panel wires 104 and 106 are aligned and arranged such that one of pockets 108 and 110 will meet and interengaged a corresponding ridge or other non-pocket section of the interconnecting wire. In accordance with the subject matter of the present disclosure, during the interweaving process (or at some time thereafter), one of second panel wires 106 can be omitted to generate a gap or space (not numbered) between the remaining second panel wires that is greater than offset dimension OD2. In a preferred arrangement, one of the second panel wires can be omitted at consistent, predetermined intervals during the manufacturing process of flooring panels 102.

Flooring system 100 can also include at least one support element, which may alternately be referred to herein as a support rail, that is operatively engaged with the flooring panel. In a preferred arrangement, a plurality of support elements 118 are disposed in spaced relation to one another along flooring panel 102. In a preferred arrangement, support elements 118 can be operatively engaged with flooring panel within the spaces (not numbered) generated by the omitted wires, as discussed above. In this manner, the support elements function to replace the omitted wires and thereby at least partially fill the gaps left thereby. Additionally, in a preferred arrangement, support elements 118 can extend through flooring panel 102 and operatively engage one or more panel wires of the flooring panel to provide substantially increased structural rigidity and load carrying capability to the flooring system. In this way, flooring system 100 can be self-supporting and capable of spanning pits, cavities or channels while providing stable support to livestock walking across and standing on the flooring system. As such, a flooring system in accordance with the subject matter of the present disclosure can extend across a pit, cavity or channel without using a conventional substructure or frame to support the flooring panel.

Figure 5:
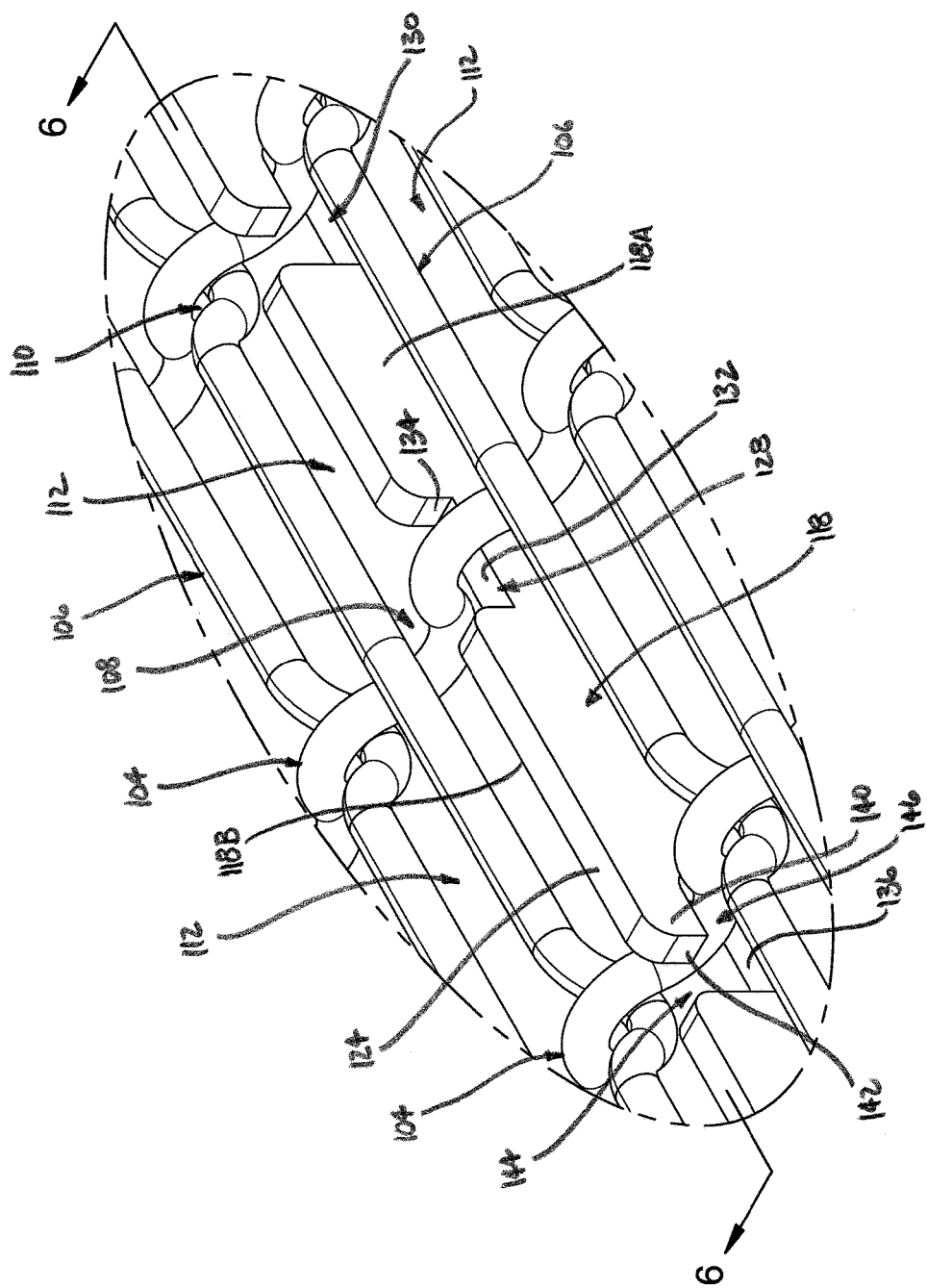
FIG. 5 is a greatly enlarged perspective view of a portion of the exemplary flooring system shown in FIGS. 2-4, which is identified as Detail 5 in FIG. 4.
Figure 6:
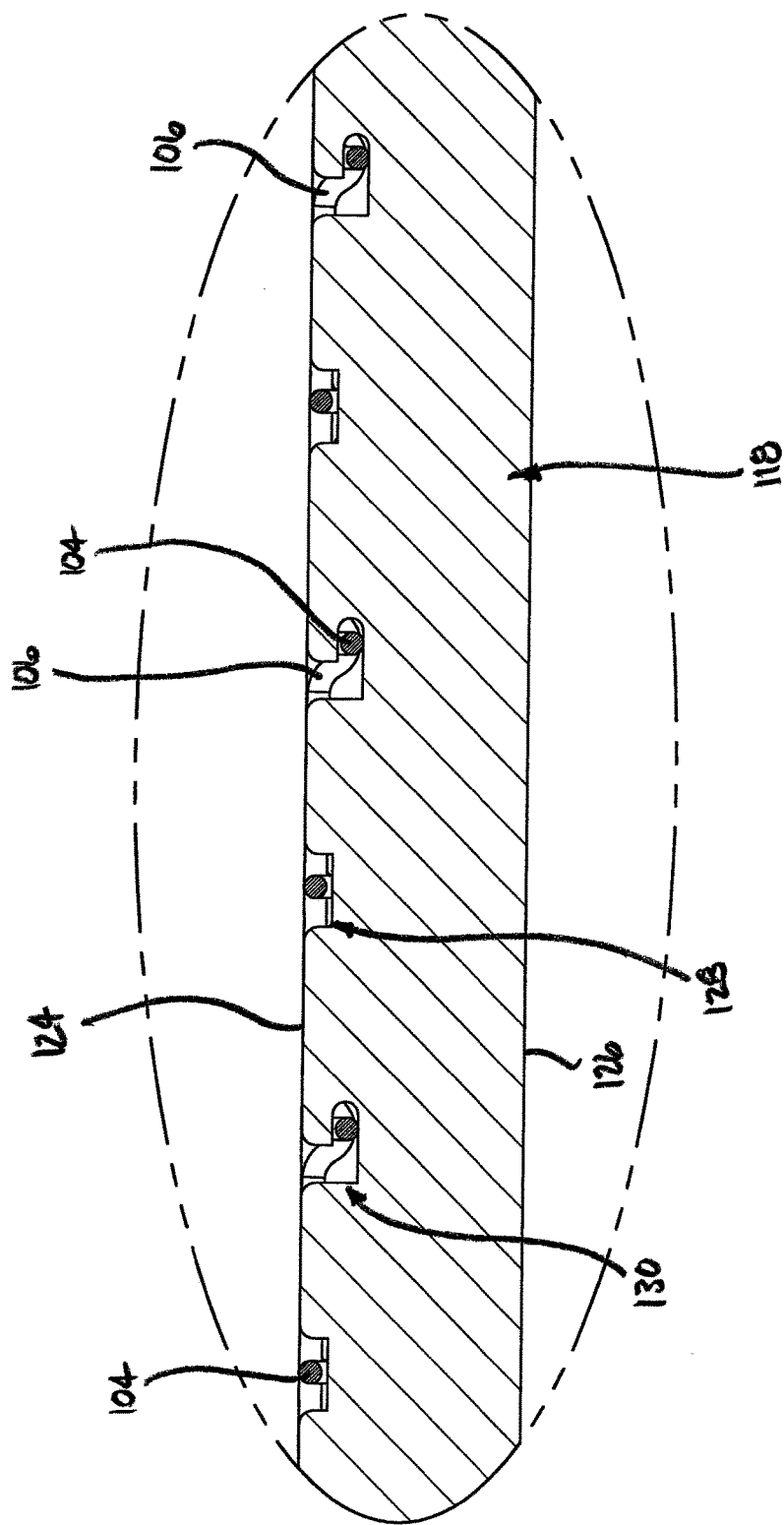
FIG. 6 is a cross-sectional side view of the exemplary flooring system in FIGS. 2-5 taken from along line 6-6 in FIG. 5.
Figure 7:
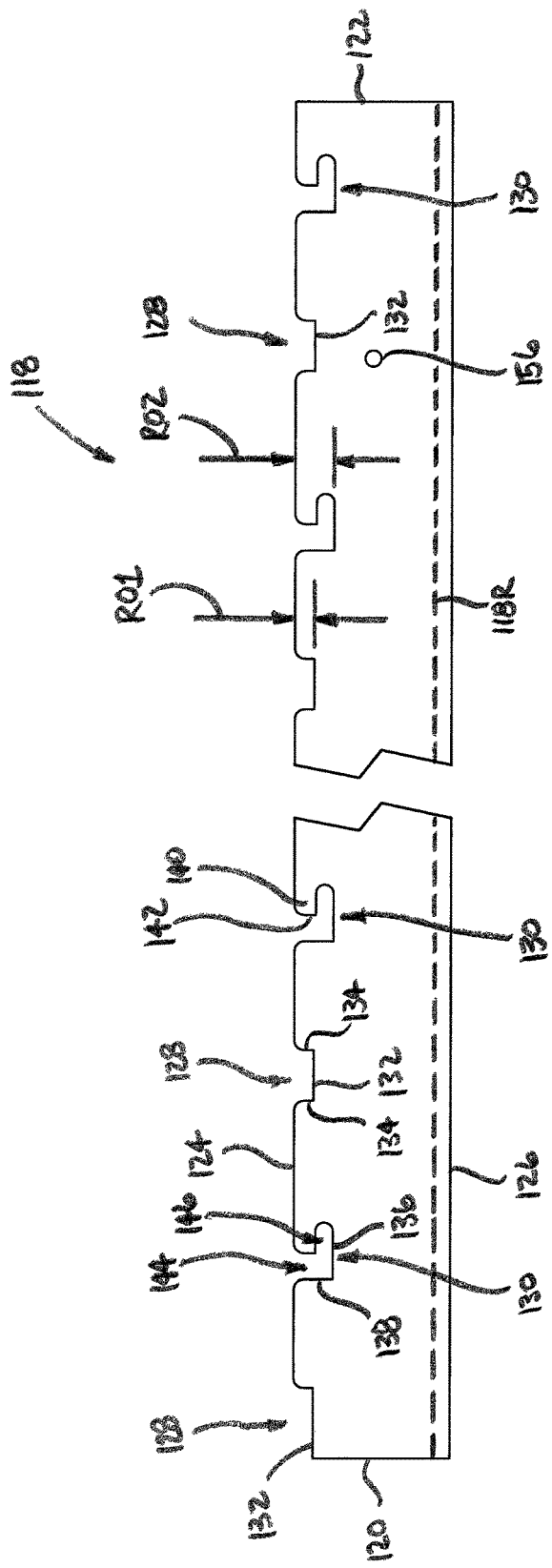
FIG. 7 is a side view of one example of a support element of the exemplary flooring system shown in FIGS. 2-6.

It will be appreciated that support elements in accordance with the subject matter of the present disclosure can be of any suitable type, kind, configuration and/or construction. For example, the support elements can have any suitable cross-sectional shape and/or profile, and can include any suitable number of one or more walls and/or wall portions. In a preferred arrangement, the support elements can include at least one wall portion with opposing sides or side surfaces, such as are represented in FIG. 5 by reference numbers 118A and 118B. As a non-limiting example, the support elements can include an approximately planar support plate having an approximately rectangular cross-sectional shape. As other non-limiting examples, support rails having L-shaped or inverted T-shaped cross-sectional profiles could be used, such as is represented in FIGS. 7 and 8 by dashed lines 118R, for example.

Regardless of the cross-sectional shape or profile thereof, support elements 118 can extend lengthwise between opposing ends 120 and 122, and heightwise between a first or upper edge 124 and a second or lower edge 126. Additionally, support elements 118 can include one or more features for operatively engaging one or more of panel wires 104 and/or 106. It will be appreciated that recesses of any suitable size and/or shape can be used in any suitable configuration and/or arrangement. For example, support elements 118 are shown as including a plurality of first recesses 128 that extend into the support element from along upper edge 124. First recesses 128 are disposed in spaced relation to one another. Additionally, or in the alternative, support elements 118 can include a plurality of second recesses 130.

In the arrangement shown, first recesses 128 have an approximately linear bottom surface 132 that is offset from upper edge 124 by a first recess offset RO1. Side surfaces 134 extend from along bottom surface 132 and interconnect with upper edge 124 in an approximately transverse orientation thereto. In this manner, the ridges of first panel wires 104 can extend through recesses 128 as if encountering a pocket of one of the second panel wires. One advantage of such a configuration is that the linear bottom surface can permit support elements 118 to slide or otherwise translate relative to the first panel wires such as may occur during assembly and/or can accommodate variations in position of the first panel wires.

Second recesses 130 are shown as being shaped differently than first recesses 128. More specifically, second recesses 130 include an approximately linear bottom surface 136 that is offset from upper edge 124 by a second recess offset RO2 that is shown as being different from (e.g., greater than) first recess offset R01. Second recesses 130 also include a side surface 138 that extends from along bottom surface 136 and interconnects with upper edge 124 in an approximately transverse orientation thereto. Second recesses 130 differ from first recesses 128 at least in that recess arms 140 extend toward a distal edge 142 that is disposed in spaced relation to side surface 138 to form an opening or passage 144 dimensioned to receive at least one of first panel wires 104. In this manner, second recesses 130 have an approximately L-shaped configuration with an elongated slot portion 146 that receives and retains one of the first panel wires. As a result, the first panel wire is received and retained beneath upper recess arm 140, which resists and substantially inhibits displacement of support elements 118 toward and away from upper panel plane 114.

As discussed above, support elements 118 can be operatively engaged with flooring panel within the spaces (not numbered) generated by the omitted ones of the second panel wires, as discussed above. In this manner, each support element can function to replace an omitted wire and thereby at least partially fills the gap left thereby. During assembly, support element 118 can be positioned along bottom panel plane 116, and oriented such that first and second recesses 128 and 130 are positioned in approximate alignment with corresponding ones of first panel wires 104. In such a condition, the first panel wires can extend into first and second recesses 128 and 130 (through passage 144 with regard to the latter). Once aligned, support elements 118 can be displaced from along bottom panel plane 116 toward top panel plane 114 until upper edge 124 is disposed in approximate alignment with the top panel plane. The support elements can then be displaced laterally (i.e., in the widthwise direction with respect to flooring panel 102) such that one or more of first panel wires 104 are received within elongated slot portion 146 to thereby retain the support elements in engagement with the first panel wires, as discussed above.

To inhibit inadvertent disengagement of the support elements from the flooring panel, a retaining element 148 can be operatively secured on or along the support element and/or the flooring panel in a suitable manner. As one example, retaining element 148 can include a side wall portion 150 dimensioned to abuttingly engage a side surface of the associated support element. A projection wall portion 152 can extend from along side wall portion 150, and can be dimensioned to extend between the associated one of first panel wires 104 and side surface 138 of second recess 130. In this manner, the first panel wire is captured within elongated slot portion 146 and lateral movement between the support element and flooring panel is substantially inhibited. Retaining element 148 can be secured on or along support element 118 (or the flooring panel) in any suitable manner. As one example, a threaded connector (not shown) could extend through a hole 154 in side wall portion 150 as well as a corresponding hole 156 in support element 118 to secure the retaining element on or along the support element.

As discussed above, flooring system 100 is self-supporting and can directly engage an associated base or ground surface (e.g., base surface BSF) or wall structures (e.g., end surfaces ESF of side wall portions SWP). In some cases, however, flooring system 100 can, optionally, include one or more support bases or feet 158 that can be installed on or along support elements 118 to provide a broader contact surface for engaging the associated base or ground surface (e.g., base surface BSF) or wall structures (e.g., end surfaces ESF of side wall portions SWP). It will be appreciated that feet 158 can be of any suitable type, kind, configuration and/or construction. For example, as shown in FIGS. 8-11, feet 158 can include a base wall portion 160 and a side wall portion 162 that extends from along base wall portion 160 in transverse orientation thereto. One or more holes or openings 164 can be used to secure the feet on or along the associated base or ground surface (e.g., base surface BSF) or wall structures (e.g., end surfaces ESF of side wall portions SWP), such as by way of threaded fasteners 166, for example. An elongated slot or opening 168 can extend through base wall portion 160 and/or side wall portion 162. In a preferred arrangement, elongated slot 168 has an overall shape that is complimentary to the cross-sectional shape or profile of the corresponding support elements. For example, elongated slot 168 is shown in FIGS. 8-11 as having a slot portion 168A with a generally linear configuration dimensioned to receive at least a portion of support element 118, such as a portion having an approximately rectangular cross-section, for example. As another example, slot 168 could include one or more slot portions 168B and/or 168C that extend generally transverse to slot portion 168A. In such case, slot portions 168B and/or 168C, if included, can be dimensioned to accommodate one or more flange wall portions 118R of support element 118, for example. Additionally, elongated slot is preferably dimensioned to be received over and engage one of first and second recesses 128 and/or 130. During assembly, feet 158 can be assembled onto support elements 118, such as along opposing ends thereof, prior to engaging the support elements with the first panel wires of the flooring panel.

With reference, now, to FIGS. 14-19, one example of a flooring assembly 200 is shown that includes a flooring panel 202. It will be appreciated that flooring panels of any suitable size, shape, configuration and/or construction can be used. In a preferred arrangement, the flooring panel can include a plurality of holes or openings formed therethrough to permit excrement and other materials to pass through the flooring panel. Additionally, in a preferred arrangement, flooring panel 202 can be formed from a plurality of wires that are operatively interconnected to one another, such as by welded joints and/or by interweaving the wires together with one another. Additionally, it will be appreciated that the flooring panels will have an outer periphery that at least partially defines the overall size and shape of the flooring panels. While it will be appreciated that any suitable size and/or shape can be used, as mentioned above, in many cases, the flooring panels will have a square or rectangular overall shape. As such, many flooring panel will can be referred to as having a length and a width as is conventionally understood.

Figure 15:
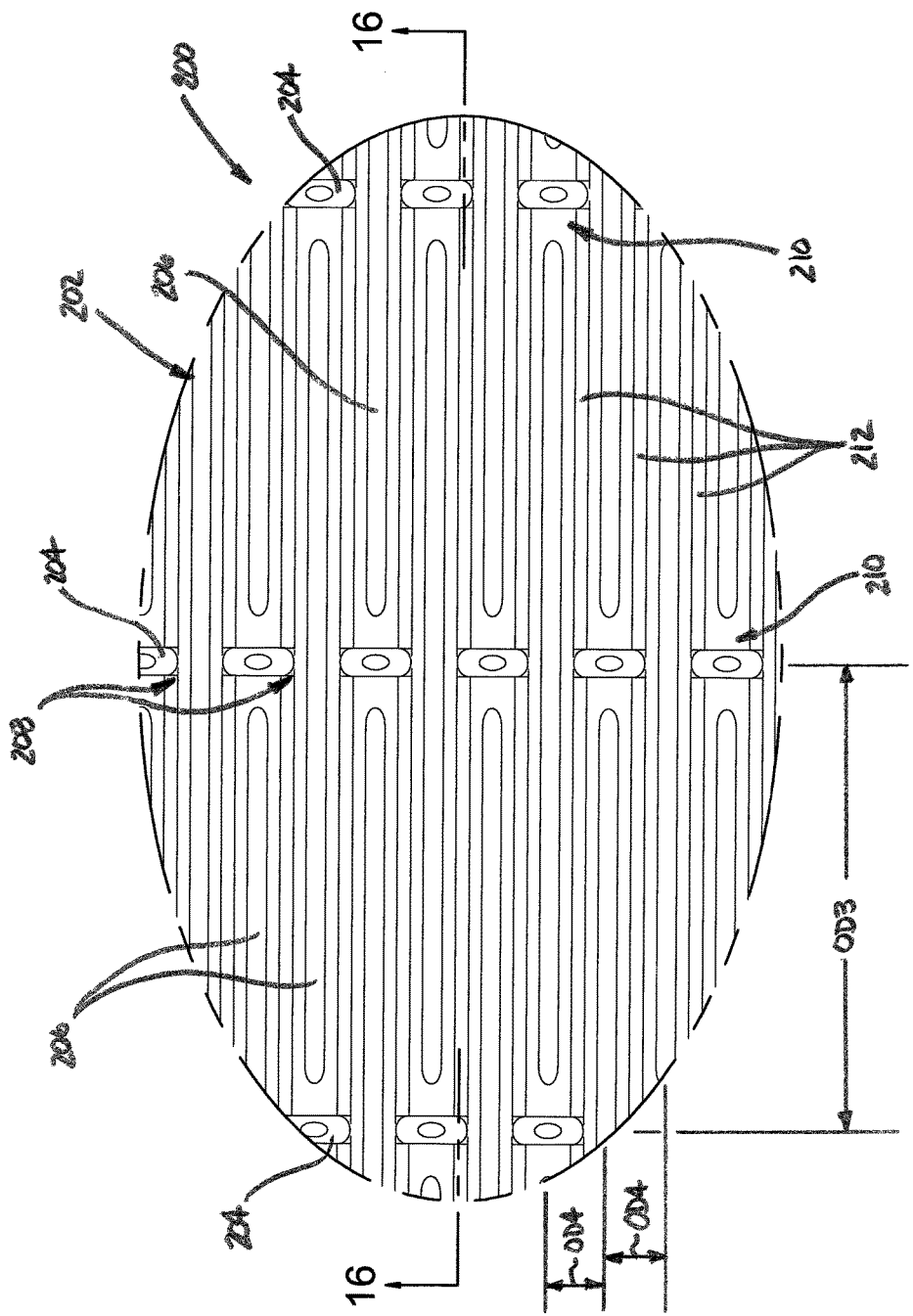
FIG. 15 is an enlarged plan view of a portion one example of a flooring panel from the flooring assembly in FIGS. 1 and 14, which is identified as Detail 15 in FIG. 14.

As one example of a suitable construction, flooring panel 202 can include a plurality of first panel wires 204 that extend lengthwise along the flooring panel, such as are identified in FIGS. 15-19. First panel wires 204 may, in some cases, be referred to in the art as line wires, and extend lengthwise along flooring panel 202. In a preferred arrangement, first panel wires 204 are disposed in spaced relation to one another in the widthwise direction of the flooring panel, as is represented in FIG. 15 by a wire offset dimension OD3. Flooring panel 202 can also include a plurality of second panel wires 206 that extend widthwise along the flooring panel, such as are identified in FIGS. 15-19. Second panel wires 206 may, in some cases, be referred to in the art as cross wires, and extend widthwise along flooring panel 202. In a preferred arrangement, second panel wires 206 are disposed in spaced relation to one another in the lengthwise direction of the flooring panel, as is represented in FIG. 15 by a wire offset dimension OD4.

Additionally, in a preferred arrangement, first panel wires 204 can be formed from elongated lengths of material having an approximately round cross-sectional shape with a nominal cross-sectional dimension that can be approximately equal from one wire to the next. That is, in some cases, all of the first panel wires can be of a common size and have an approximately common cross-sectional shape. Similarly, second panel wires 206 can be formed from elongated lengths of material having an approximately round cross-sectional shape with a nominal cross-sectional dimension that can be approximately equal from one wire to the next. That is, in some cases, all of the second panel wires can be of a common size and have an approximately common cross-sectional shape. In some cases, the first and second panel wires can be substantially similar to one another in size and/or shape. In other cases, however, the first panel wires will be of a different size and/or shape than the second panel wires. An exemplary range approximate cross-sectional dimension for the first and second panel wires is from approximately 0.050 inches to approximately 0.500 inches. And, it will be appreciated that any suitable combination of sizes for the first and second panel wires can be used.

As shown in FIGS. 14-19, first panel wires 204 and second panel wires 206 are interwoven with one another to form a cloth-like mesh construction. The first and second panel wires can be formed into such a configuration in any suitable manner and through the use of any suitable combination of features on or along the first and second panel wires. As one example, first panel wires 204 can include a plurality of sections of wire that are deflected or otherwise deformed away from a reference axis AX (FIG. 16) to at least partially define pockets 208 that are disposed in spaced relation to one another along the length of the wire. Similarly, second panel wires 206 can include a plurality of sections of wire that are deflected or otherwise deformed away from reference axis AX to at least partially define pockets 210 that are disposed in spaced relation to one another along the length of the wire.

In many cases, the dimension or spacing between adjacent ones of pockets 208 and/or adjacent ones of pockets 210 (i.e., the spacing between adjacent pockets on a single wire) can be generally uniform. In some cases, however, such spacing could vary along the length of a single wire. Additionally, or in the alternative, the spacing between pockets can be consistent along a single wire, but can vary between one wire and an adjacent wire. In a preferred arrangement, such as is shown in FIGS. 14-19, for example, all of first panel wires 204 can have an approximately-uniform first pocket spacing (not identified) between adjacent pockets 208, and all of second panel wires 206 can have an approximately-uniform second pocket spacing (not identified) between adjacent pockets 210. In such case, the first pocket spacing can be different from the second pocket spacing such that rectangular holes or spaces 212 extending through flooring panel 202. It will be appreciated that as the spacing between adjacent pockets on a single wire increases, the wire can appear to have an approximately linear profile with only intermittent deviations due to the occasional pocket. Conversely, as the spacing between adjacent pockets on a single wire decreases, the wire can increasingly appear to have a continuous wave-like profile. In the arrangement shown in the subject application second panel wires 206 may appear to have a more linear profile whereas first panel wires 204 may appear to have more of a continuous wave-like profile. For purposes of clarity and ease of understanding, reference is made herein to a ridge being the section of wire extending between and connecting adjacent pockets along a single wire.

In a preferred construction, first panel wires 204 and second panel wires 206 are configured and arranged in such a way so as to at least partially define a first or top panel plane 214 and a second or bottom panel plane 216 that is offset from the top panel plane by approximately the height of the pockets formed on or along the first and second panel wires. As can be seen from FIGS. 15-19, for example, in a preferred arrangement, first and second panel wires 204 and 206 are aligned and arranged such that one of pockets 208 and 210 will meet and interengaged a corresponding ridge or other non-pocket section of the interconnecting wire.

Flooring assembly 200 can be supported on or along a pit, cavity, channel or other area (e.g., channel CHN) of a collection area CLA in any suitable manner, such as by being supported on or along end surfaces ESF of side wall portions SWP, for example. It will be appreciated that flooring assembly 200 can include any combination of features and/or components that may be suitable for supporting the flooring assembly as the same extends along and/or across the collection area. As one example, flooring panel 202 could be constructed as described above in connection with FIGS. 2-13 and, in such case, could include support elements that are interconnected with the flooring panel in place of one or more line wires and/or cross wires.

Figure 14:
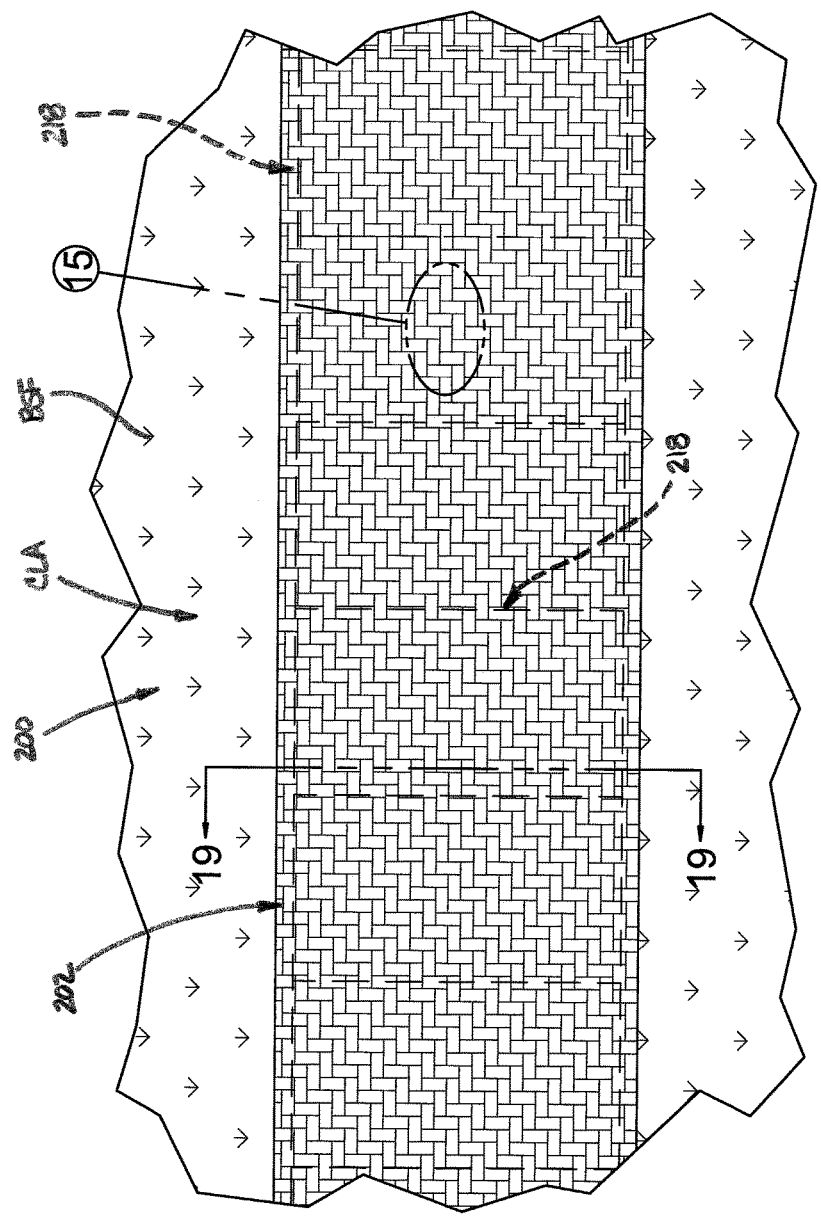
FIG. 14 is a top plan view of a portion of a collection area of the agricultural facility in FIG. 1 with flooring assemblies in accordance with the subject matter of the present disclosure extending thereacross.

Additionally, or in the alternative, flooring assembly 200 can include a suitable foundation, frame or sub-structure, such as is represented in FIGS. 14 and 19 by a frame structure 218, for example. It will be appreciated that frame structure 218 can be of any suitable type, kind, configuration and/or construction that can operatively engage and secure flooring panel 202 on or along an associated base or ground surface (e.g., base surface BSF) or wall structures (e.g., end surfaces ESF of side wall portions SWP). In a preferred arrangement, frame structure 218 can provide substantial structural rigidity and load carrying capability to the flooring assembly. In this way, flooring assembly 200 can be capable of spanning pits, cavities and/or channels while providing stable support to livestock walking across and standing on the flooring assembly.

It will be appreciated that the frame structure can be secured on or along the associated base or ground surface (e.g., base surface BSF) or wall structures (e.g., end surfaces ESF of side wall portions SWP) in any suitable manner. For example, frame structure 218 can include one or more holes or openings (not shown) extending therethrough that can be used to secure the frame on or along the associated base or ground surface (e.g., base surface BSF) or wall structures (e.g., end surfaces ESF of side wall portions SWP), such as by way of threaded fasteners 220, for example.

As discussed above, it is desirable to continue to develop flooring panels having openings formed therethrough that are of a reduced size in an effort to minimize the adverse effects that otherwise conventional flooring panels can have on livestock. It has been recognized that certain challenges are associated with the manufacture of flooring panels that are formed as woven wire with sufficiently reduced openings to provide the desired improvements in animal welfare while also resulting in a construction that is stable and robust for use in such environments. Flooring panel assemblies according to the subject concept overcome such challenges and result in flooring panels that are formed as woven wire mesh with openings that are of sufficiently small size to provide improved comfort for livestock while retaining sufficient strength during use in supporting animals walking and standing on the flooring panels. More specifically, it has been determined that a construction in accordance with the subject matter of the present disclosure will permit the wires of flooring assemblies to be assembled together in an arrangement in which the gap between adjacent wires is less than thirty-five percent of the nominal dimension of the wire. In some cases, a gap of less than thirty percent has been achieved. In further cases, a flooring assemblies with a preferred gap of less than twenty-five percent have been manufactured.

Figure 16:
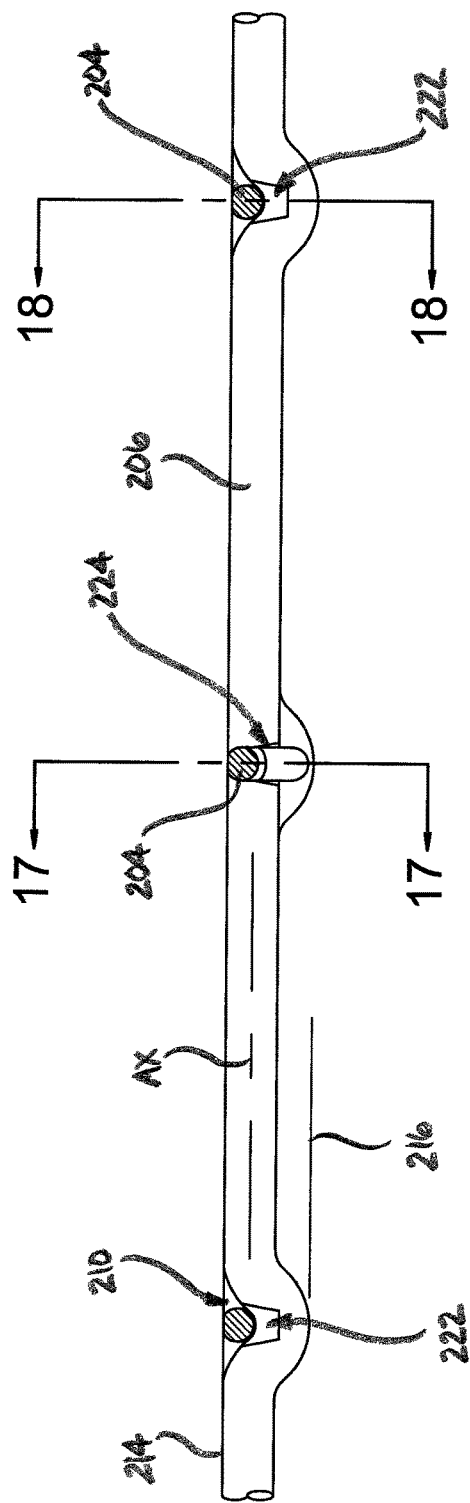
FIG. 16 is a cross-sectional side view of the exemplary flooring panel in FIGS. 14 and 15 taken from along line 16-16 in FIG. 15.

In accordance with the subject matter of the present disclosure, FIGS. 15-18 illustrate panel wires 206 having at least one notch formed therein that is dimensioned to receive at least a portion of panel wires 204. In this manner, panel wires 206 can be manufactured and assembled together with panel wires 204 in a pattern in which the openings remaining therebetween have a reduced dimension in comparison with conventional constructions. As one example, panel wires 206 can have a midline ML that extends lengthwise therealong. A plurality of first notches 222 can be formed in spaced relation to one another along panel wires 206. Additionally, or in the alternative, a plurality of second notches 224 can be formed in spaced relation to one another along panel wires 206. In a preferred arrangement, first notches 222 and second notches 224 are likewise disposed in spaced relation to one another. For example, first notches 222 could be disposed on or along pockets 210 of panel wires 206 with second notches 224 disposed between pockets 210, such as is shown in FIG. 16, for example.

Figure 17:
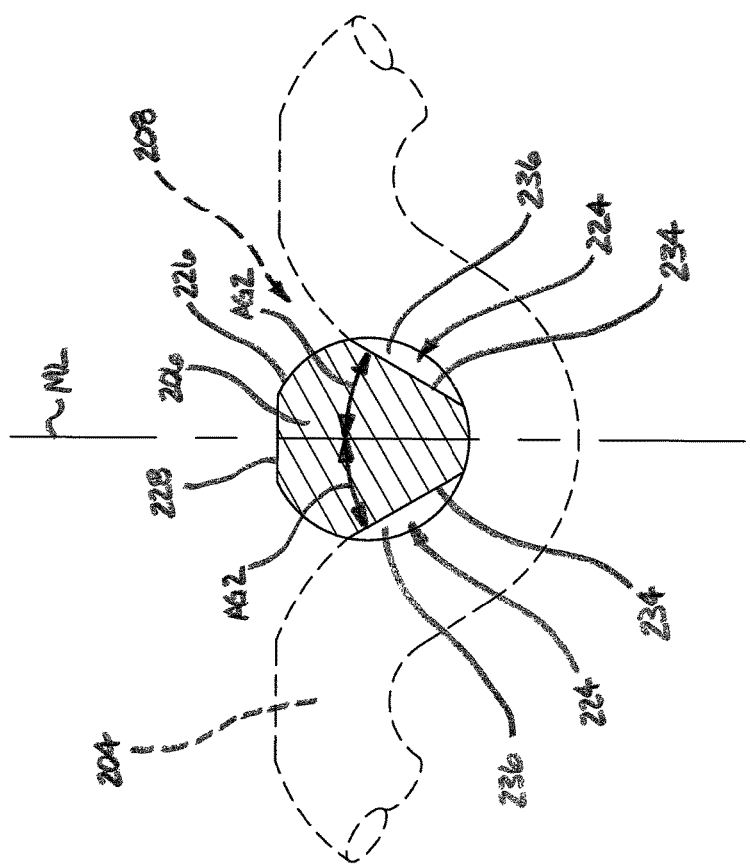
FIG. 17 is a greatly enlarged portion of the exemplary flooring panel in FIGS. 14-16 taken from along line 17-17 in FIG. 16.
Figure 18:
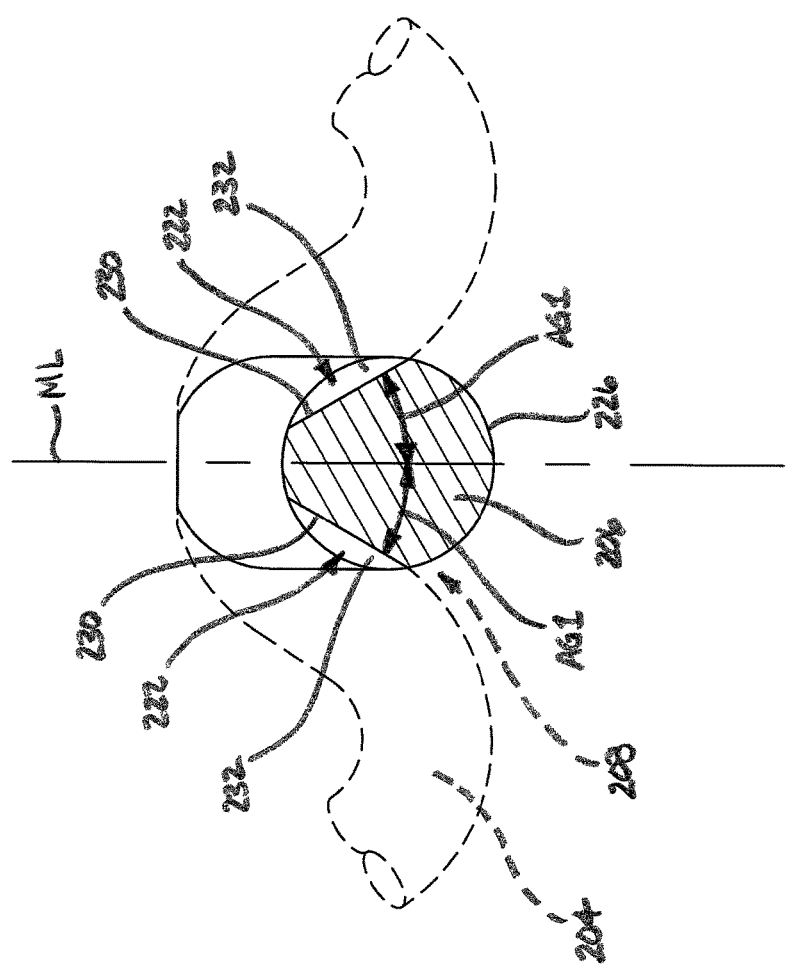
FIG. 18 is another greatly enlarged portion of the exemplary flooring panel in FIGS. 14-16 taken from along line 18-18 in FIG. 16.

It will be appreciated that first notches 222 and second notches 224 can be of the same or different configurations and/or arrangements in comparison with one another. For example, the first notches could be formed on only one side of the panel wire while the second notches could be formed along both sides of the panel wire. As another example, panel wires 206 are shown as having an outer surface 226. In some cases, one or more formed geometric features (e.g., a flat) 228 can be dispose along a portion thereof. First notches 222 are shown in FIG. 18 as extending into panel wires 206 from along outer surface 226 and including a notch surface 230 that is disposed at an acute angle AG1 to midline ML. Additionally, notch surface 230 can extend axially between end surface portions 232. Second notches 224 are shown in FIG. 17 as extending into panel wires 206 from along outer surface 226 and including a notch surface 234 that is disposed at an acute angle AG2 to midline ML. Additionally, notch surface 234 can extend axially between end surface portions 236. In a preferred arrangement, angles AG1 and AG2 can have a value within a range of from approximate 15 degrees to approximately 45 degrees.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially permanent connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A flooring system comprising:
a flooring panel having an outer periphery and defining an upper panel plane and a lower panel plane that is offset from said upper panel plane, said flooring panel including a plurality of first panel wires extending lengthwise across said outer periphery in a first direction and a plurality of openings formed through said flooring panel within said outer periphery; and,
a support element extending lengthwise between opposing ends and including an upper edge and lower edge, said support element extending through and operatively connected with said flooring panel such that said upper edge is disposed in approximate alignment with said upper panel plane and said lower edge is disposed in offset relation to said lower panel plane in a direction opposite said upper panel plane.

2. A flooring system according to claim 1, wherein said flooring panel includes a plurality of second panel wires extending lengthwise across said outer periphery in a second direction that is oriented transverse to said first direction to form a grid pattern.

3. A flooring system according to claim 2, wherein said pluralities of first and second panel wires are at least one of interwoven with one another and welded to one another to at least partially form said flooring panel.

4. A flooring system according to claim 1, wherein adjacent ones of said plurality of first panel wires are spaced apart from one another by a first offset distance in a second direction that is oriented transverse to said first direction.

5. A flooring system according to claim 4, wherein said flooring panel includes a plurality of second panel wires extending lengthwise across said outer periphery in said second direction with adjacent ones of said plurality of second panel wires spaced apart from one another in said first direction by a second offset distance that is less than said first offset distance.

6. A flooring system according to claim 5, wherein said support element includes a first side and a second side opposite said first side, said support element is operatively connected to at least two of said plurality of first panel wires in place of one of said plurality of second panel wires such that one of said plurality of second panel wires disposed along one of said first and second sides of said support element is spaced apart from said support element by approximately said second offset distance.

7. A flooring system according to claim 5, wherein said support element is one of a plurality of support elements disposed in spaced relation to one another in said first direction.

8. A flooring system according to claim 7, wherein said plurality of support elements are spaced apart from one another by a support element distance that is equal to or greater than at least two-times said second offset distance.

9. A flooring system according to claim 1, wherein said flooring panel includes a plurality of second panel wires extending lengthwise across said outer periphery in a second direction that is oriented transverse to said first direction with said plurality of second panel wires having an approximately-common nominal cross-sectional dimension, and with said support element having a thickness approximately equal to said nominal cross-sectional dimension of said plurality of second panel wires.

10. A flooring system according to claim 1, wherein said support element has a plurality of recesses extending thereinto from along said upper edge.

11. A flooring system according to claim 10, wherein said plurality of recesses include a plurality of first recesses having an approximately common shape, and a plurality of second recess having an approximately common shape that is different from said plurality of first recesses.

12. A flooring system according to claim 10, wherein said plurality of recesses include at least one recess with an upper recess arm extending along said upper edge such that said at least one recess has an approximately L-shaped configuration at least partially formed in offset relation to said upper edge.

13. A flooring system according claim 12, wherein said at least one approximately L-shaped recess is dimensioned to receive at least a portion of one of plurality of first panel wires beneath said upper recess arm to resist displacement of said support element toward and away from said upper panel plane.

14. A flooring system according to claim 12, wherein two or more of said plurality of recesses have said approximately L-shaped configuration.

15. A flooring system according to claim 10 further comprising a retaining element operatively secured to said support element and at least partially received in one of said plurality of recesses to substantially inhibit lateral displacement of said support element relative to at least said plurality of first panel wires.

16. A flooring system according claim 1 further comprising a base element operatively connected to an end of said support element and dimensioned to secure said support element along an associated support wall.

17. A flooring system comprising:
a flooring panel having an outer periphery and defining an upper panel plane and a lower panel plane that is offset from said upper panel plane, said flooring panel including a plurality of first panel wires extending lengthwise across said outer periphery in a first direction, a plurality of second panel wires extending lengthwise across said outer periphery in a second direction that is oriented transverse to said first direction and a plurality of openings formed through said flooring panel within said outer periphery between said first and second pluralities of wires; and,
a support element extending lengthwise between opposing ends and including an upper edge and a lower edge, said support element extending throuqh and operatively connected with said flooring panel such that said upper edge is disposed in approximate alignment with said upper panel plane and said lower edge is disposed in offset relation to said lower panel plane in a direction opposite said upper panel plane with said plurality of second panel wires having a common nominal cross-sectional dimension and being spaced apart from one another in said first direction such that said plurality of openings have an opening dimension in said first direction between adjacent ones of said second panel wires with said opening dimension having an approximate distance that is less than or equal to approximately thirty-five percent of said common nominal cross-sectional dimension of said plurality of second panel wires.

18. A flooring system according to claim 17, wherein said flooring panel includes a plurality of first pockets formed in spaced relation to one another along said plurality of first panel wires and a plurality of first notches formed in spaced relation to one another along said plurality of second panel wires with one of said plurality of first notches disposed within each of said plurality of first pockets.

19. A flooring system according to claim 18, wherein said flooring panel includes a plurality of second notches formed in spaced relation to one another along said plurality of second panel wires and interleaved between adjacent ones of said plurality of first notches.

20. A flooring system comprising:
a flooring panel having an outer periphery and defining an upper panel plane and a lower panel plane that is offset from said upper panel plane, said flooring panel including a plurality of first panel wires extending lengthwise across said outer periphery in a first direction, a plurality of second panel wires extending lengthwise across said outer periphery in a second direction that is oriented transverse to said first direction and a plurality of openings formed through said flooring panel within said outer periphery between said pluralities of first and second panel wires; and, a support element extending lengthwise between opposing ends and including an upper edge and a lower edge, said support element disposed between adjacent ones of said plurality of second panel wires and operatively connected to at least one of said plurality of first panel wires such that said support element extends through said flooring panel with said upper edge disposed in approximate alignment with said upper panel plane.

* * * * *